United States Patent [19]
Yasuhara et al.

[11] Patent Number: 6,017,285
[45] Date of Patent: Jan. 25, 2000

[54] VARIABLE DIAMETER PULLEY

[75] Inventors: Shinji Yasuhara, Yamatokoriyama; Takao Tamagawa, Kitakatsuragi-gun, both of Japan

[73] Assignee: Koyo Seiko Co., Ltd., Osaka, Japan

[21] Appl. No.: 09/103,372

[22] Filed: Jun. 24, 1998

[30] Foreign Application Priority Data

Jun. 27, 1997 [JP] Japan ..................... 9-172462
Jul. 11, 1997 [JP] Japan ..................... 9-186921

[51] Int. Cl.[7] ........................... F16H 59/00; F16H 61/00; F16H 55/56
[52] U.S. Cl. ................... 474/12; 474/17; 474/46
[58] Field of Search ..................... 474/166, 167, 474/174, 179, 181, 8, 12, 17, 19, 46

[56] References Cited

FOREIGN PATENT DOCUMENTS 5-500261  1/1993  Japan .

Primary Examiner—Tamara L. Graysay
Assistant Examiner—Matthew A. Kaness
Attorney, Agent, or Firm—Rabin & Champagne, P.C.

[57] ABSTRACT

A variable diameter pulley according to the present invention has a pair of pulley bodies each axially movably fitted around a rotation shaft. A power transmission ring is held between power transmission surfaces formed in a tapered shape on opposed surfaces of the pair of pulley bodies. A belt is engaged with the outer circumference of the power transmission ring. The power transmission ring is movable eccentrically with respect to an axis of the pulley bodies. The pulley bodies are biased toward each other by a belleville spring. The belleville spring couples the pulley bodies to each other for power transmission. A torque is transmitted between the belt and the rotation shaft through the power transmission ring, the pulley bodies, the belleville spring and a coupling member.

24 Claims, 16 Drawing Sheets

F I G. 2
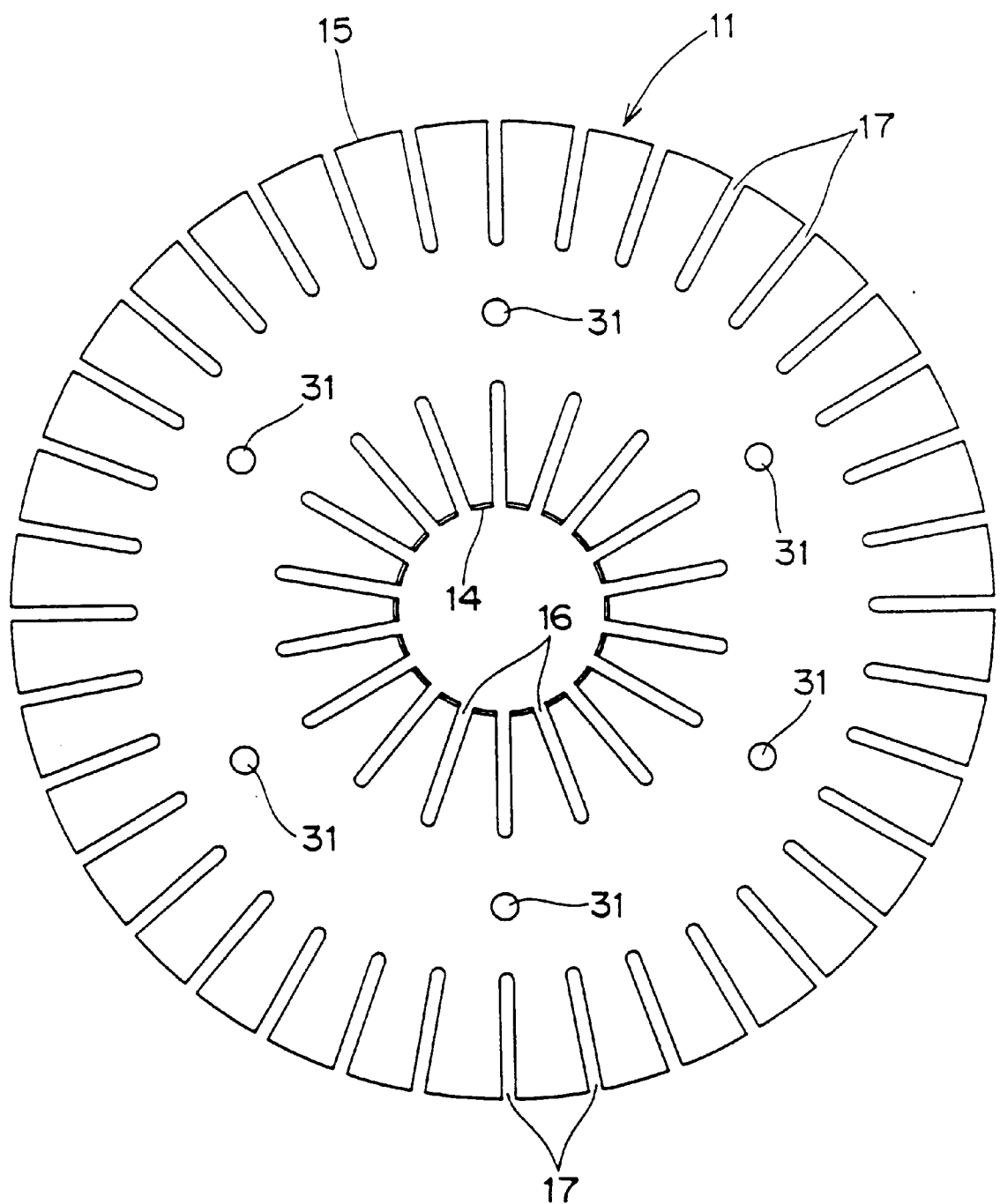

F I G. 9
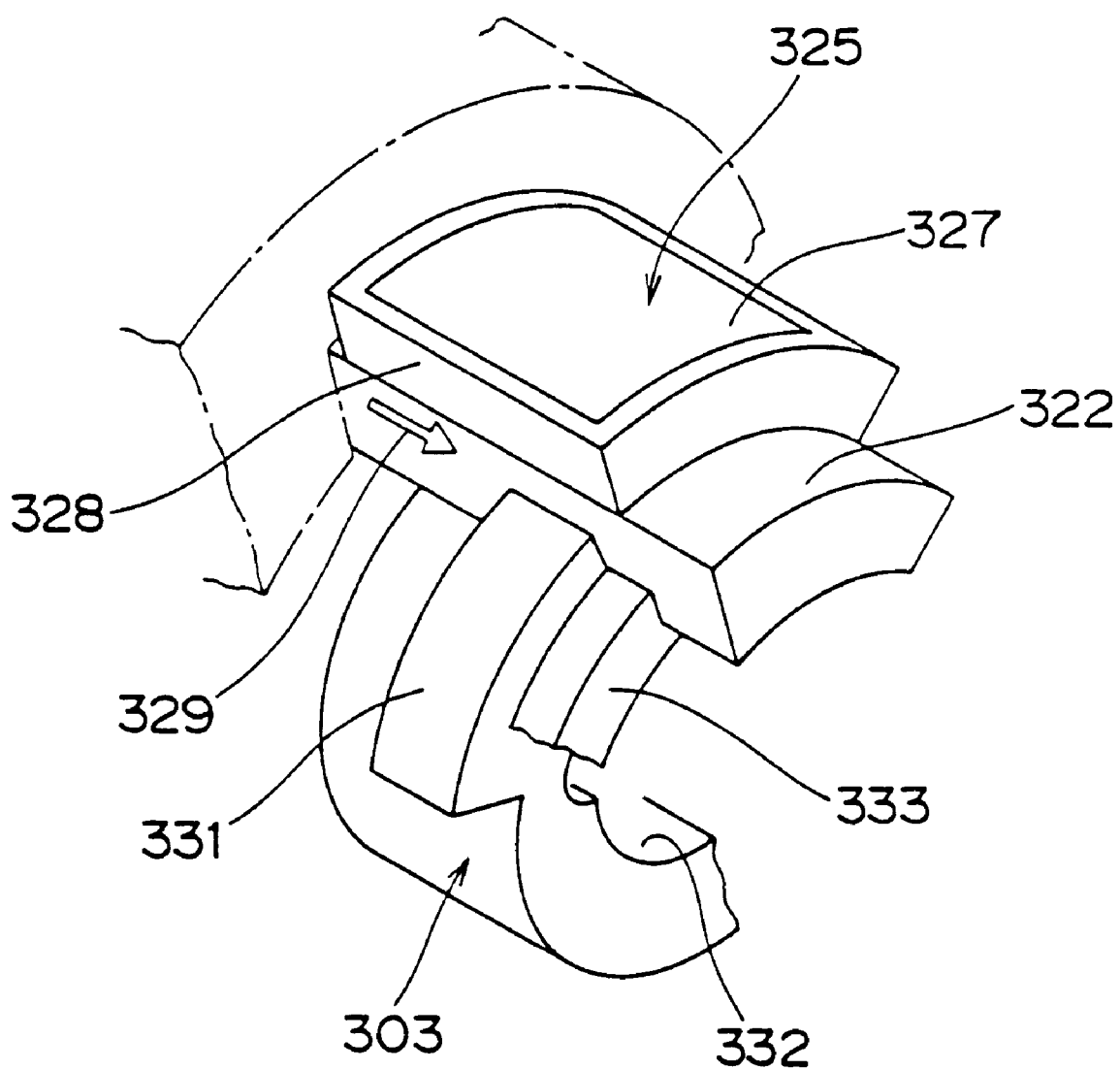

VARIABLE DIAMETER PULLEY

CROSS REFERENCE TO RELATED APPLICATION

This application claims priority benefits under 35 USC §119 on the basis of Japanese Patent Applications No. 9-172462 and No. 9-186921 filed on Jun. 27, 1997 and on Jul. 11, 1997, respectively, the disclosure thereof being incorporated herein by reference.

BACKGROUND OF THE INVENTION

The present invention relates to a variable diameter pulley which is capable of varying its effective diameter with respect to a belt.

Conventionally, belt transmission systems are employed for driving auxiliary systems such as a car compressor and an oil pump of an automobile.

Such a belt transmission system is adapted to transmit a driving force from a crank shaft of an engine to an auxiliary system through pulleys and a belt at a predetermined transmission gear ratio. Therefore, the rotation speed of the auxiliary system is increased as the rotation speed of the crank shaft is increased. The operation efficiency of the auxiliary system is generally increased with the increase in the rotation speed thereof, but the efficiency tends to decrease when the rotation speed exceeds a predetermined level.

Therefore, driving the auxiliary system at a rotation speed higher than a required level leads to wasteful energy consumption, and influences the durability of the auxiliary system. In view of this, there has been proposed a belt transmission system which is capable of adjusting the rotation speed of an auxiliary system.

Such a belt transmission system is disclosed, for example, in Japanese Unexamined Patent Publication No. 5-500261 (W). The belt transmission system according to this publication employs a variable diameter pulley which is capable of varying the contact diameter of a belt stretched therearound.

The variable diameter pulley includes a multiplicity of belt engagement bars arranged in a circular pattern around a rotation shaft thereof and resiliently and radially outwardly biased by biasing means. The diameter of the circular pattern is equivalent to the effective diameter of the variable diameter pulley. The multiplicity of the belt engagement bars are radially inwardly moved in unison in resistance to a biasing force applied by the biasing means to vary the effective radius of the variable diameter pulley (the contact radius of the belt).

More specifically, the variable diameter pulley has a pair of rotation plates opposed to each other and respectively formed with a multiplicity of grooves extending radially and spirally in opposite directions. Opposite ends of the respective belt engagement bars are supported by corresponding grooves of the rotation plates. Thus, the effective diameter can be varied with the respective belt engagement bars kept in the circular pattern as the rotation plates are relatively rotated. Used as the biasing means is a twist coil spring which is disposed between the rotation plates and adapted to rotatively bias the rotation plates toward each other in such directions that the effective diameter is increased.

The variable diameter pulley according to the aforesaid publication has a large number of components because of the provision of the multiplicity of belt engagement bars. In addition, these belt engagement bars should be kept in the circular pattern for varying the diameter of the circular pattern. Therefore, the construction of the variable diameter pulley is complicated.

A Further, when the multiplicity of belt engagement bars are moved to vary the diameter of the circular pattern, frictional resistance occurs between the opposite ends of the respective belt engagement bars and the corresponding radial grooves. Since the multiplicity of belt engagement bars each have two friction points, the variable diameter pulley has a great number of friction points. As a result, the variable diameter pulley suffers a great frictional resistance, so that it is difficult to smoothly change the rotation speed.

SUMMARY OF THE INVENTION

It is an object of the present invention to provide a variable diameter pulley which features a simple construction and smooth speed change.

In accordance with a preferable mode of the present invention to achieve the aforesaid object, there is provided a variable diameter pulley which is capable of varying its effective diameter with respect to a belt and comprises first and second annular pulley bodies each rotatable about a rotation shaft and movable along the rotation shaft, first and second power transmission surfaces formed in a tapered shape on opposed surfaces of the first and second pulley bodies, respectively, a power transmission ring held by the first and second power transmission surfaces in a state where the power transmission ring is movable eccentrically with respect to an axis of the first and second pulley bodies and wrapped with the belt on an outer circumferential surface thereof, and a biasing means for biasing the first and second pulley bodies toward each other.

In this mode, the power transmission ring is off-centered from the axis in resistance to a biasing force applied thereto by the biasing means to move the pulley bodies away from each other when the tension of the belt is increased. Thus, the effective diameter of the pulley with respect to the belt can be reduced. On the other hand, when the tension of the belt is reduced, the biasing force of the biasing means moves the pulley bodies toward each other and displaces the power transmission ring to a concentric position about the axis of the pulley bodies. Thus, the effective diameter of the pulley with respect to the belt can be increased.

Since the belt is supported by the pair of annular pulley bodies through the power transmission ring, the variable diameter pulley has a simplified construction with a reduced number of components and with a reduced number of friction points. Therefore, smooth speed change can be ensured.

BRIEF DESCRIPTION OF THE DRAWINGS

FIG. 2 is a side view of a diaphragm spring provided in the variable diameter pulley shown in FIG. 1;

FIG. 9 is a schematic perspective view illustrating a state where the guide member and a coupling member are combined with the engagement projection of the pulley body of the variable diameter pulley shown in FIG. 4;

DESCRIPTION OF THE PREFERRED EMBODIMENTS

The present invention will hereinafter be described by way of preferred embodiments thereof with reference to the attached drawings.

First Embodiment

Figure 1:
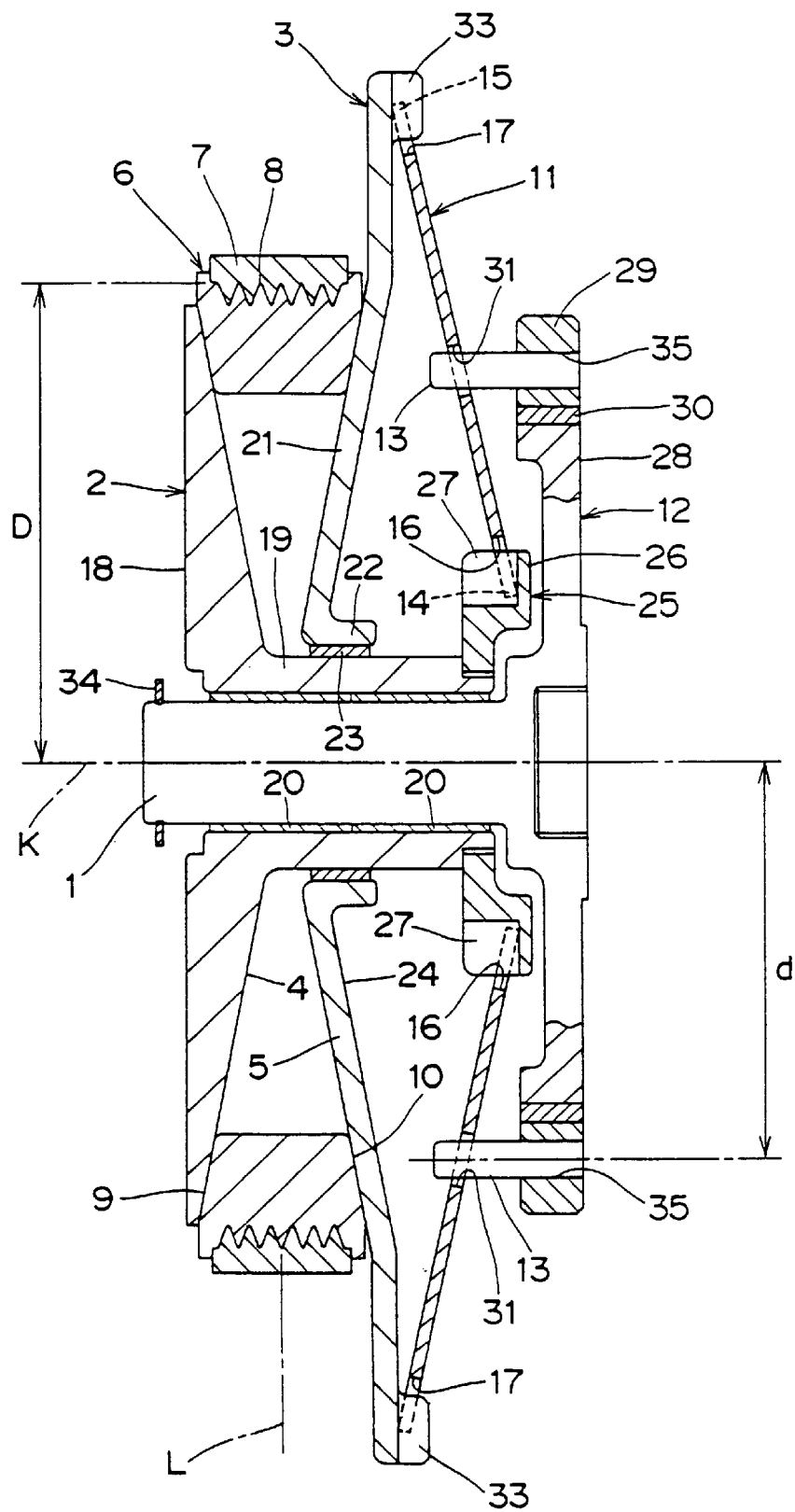
FIG. 1 is a sectional view illustrating a variable diameter pulley according to a first embodiment of the present invention with its power transmission ring kept concentric about its axis.
Figure 3:
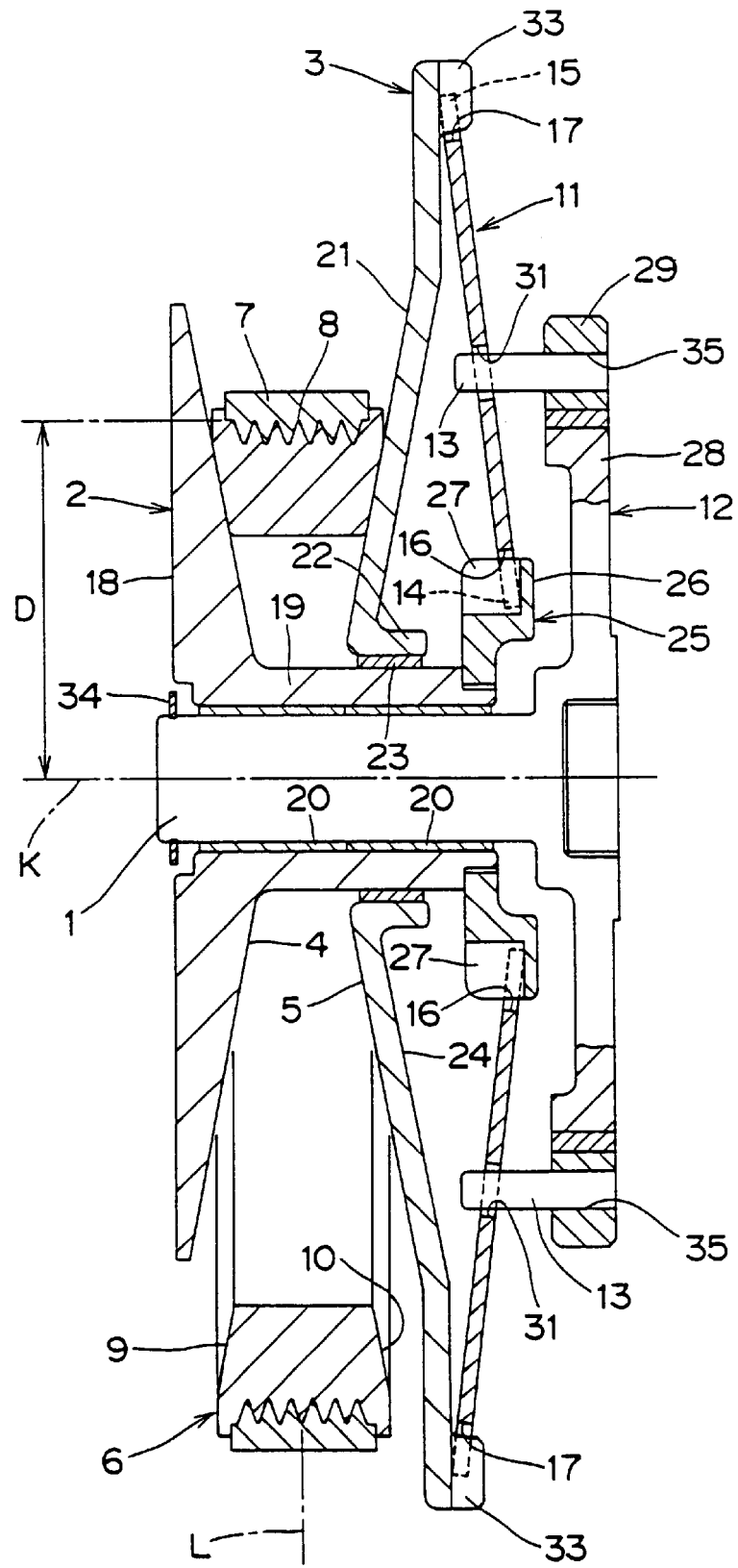
FIG. 3 is a sectional view of the variable diameter pulley shown in FIG. 1 with its power transmission ring being off-centered from the axis thereof.

With reference to FIGS. 1 to 3, an explanation will be given to a first embodiment of the present invention. Referring to FIG. 1, a variable diameter pulley according to the first embodiment is capable of varying its effective diameter with respect to a belt stretched therearound, and applied to at least one of a driving pulley and a driven pulley.

The variable diameter pulley includes first and second annular pulley bodies 2 and 3 fitted around a rotation shaft 1 movably along the rotation shaft 1 and has power transmission surfaces 4 and 5 formed on opposed faces of the pulley bodies 2 and 3, respectively. The pair of power transmission surfaces 4 and 5 are tapered in an oppositely inclined relation. A power transmission ring 6 having a generally trapezoidal shape in section is held by the power transmission surfaces 4 and 5 in such a manner that the power transmission ring 6 can be off-centered from an axis K of the pulley bodies 2 and 3 (see FIG. 3).

The power transmission ring 6 has a transmission surface 8 on its outer periphery for transmitting power to a belt 7. The belt 7 is wrapped around the power transmission ring 6 in contact with the transmission surface 8. The transmission surface 8 is formed with circumferential grooves which respectively mesh with ribs of the belt 7. Opposite side faces of the power transmission ring 6 serve as power transmission surfaces 9 and 10 which are brought into contact with the corresponding power transmission surfaces 4 and 5 for transmission of a torque.

The variable diameter pulley has a diaphragm spring 11 as biasing means for biasing the first and second pulley bodies 2 and 3 toward each other. The diaphragm spring 11 is coupled to a coupling member 12 having a disk flange shape and being co-rotatable with the rotation shaft 1 by means of a plurality of bars 13 for co-rotation with the rotation shaft 1.

A radially inward portion 14 and a radially outward portion 15 of the diaphragm spring 11 are engaged with the first pulley body 2 and the second pulley body 3, respectively, for co-rotation therewith. Thus, the respective pulley bodies 2 and 3 and the diaphragm spring 11 can co-rotate with the rotation shaft 1. Where the variable diameter pulley is employed as a driving pulley, for example, a torque is transmitted to the belt 7 through the rotation shaft 1, the diaphragm spring 11, the pulley bodies 2 and 3, and the power transmission ring 6.

Referring to FIGS. 1 and 2, the radially inward portion 14 and the radially outward portion 15 of the diaphragm spring 11 have a plurality of engagement slits 16 and 17, respectively, which are circumferentially equidistantly formed therein as extending radially. Further, the diaphragm spring 11 further has a plurality of support holes 31 circumferentially equidistantly formed in a radially intermediate portion thereof in which the bars 13 are fitted as extending therethrough.

The first pulley body 2 has a generally conical disk portion 18 and a cylindrical boss 19 provided on the inner circumference of the disk portion 18. The disk portion 18 defines the power transmission surface 4. The boss 19 is supported around the rotation shaft 1 slidably along the rotation shaft 1 by means of a bush 20 serving as a sleeve bearing. A reference numeral 34 denotes a snap ring fitted in a circumferential groove formed at an end of the rotation shaft 1 and serving as a stopper for preventing the first pulley body 2 from being withdrawn from the rotation shaft 1.

The second pulley body 3 has a generally conical disk portion 21 and a cylindrical boss 22 provided on the inner circumference of the disk portion 21. The disk portion 21 defines the power transmission surface 5. The boss 22 of the second pulley body 3 is fitted around the boss 19 of the first pulley body 2, and supported by the boss 19 of the first pulley body 2 slidably along the rotation shaft by means of a bush 23 serving as a sleeve bearing.

A plurality of planar engagement projections 33 are circumferentially equidistantly provided as extending radially on an outer circumferential portion of a back surface 24 opposite to the power transmission surface 5 of the second pulley body 3 so as to be fitted in the plurality of engagement slits 17 formed in the radially outward portion 15 of the diaphragm spring 11. The back surface 24 of the second pulley body 3 is pressed by the radially outward portion 15 of the diaphragm spring 11, so that the second pulley body 3 is biased toward the first pulley body 2.

The boss 19 of the first pulley body 2 extends through the inside of the boss 22 of the second pulley body 3 toward the side of the back surface 24 opposite to the power transmission surface 5 of the second pulley body 3. An annular coupling member 25 is provided at the distal end of the boss 19 to co-rotatably couple the distal end to the radially inward portion 14 of the diaphragm spring 11.

An inner circumferential portion of the coupling member 25 is fixed to the distal end of the boss 19 by a screw for co-rotation with the boss 19. The torque transmitted through the coupling member 25 is exerted in a screw tightening direction, so that the screw will never be loosened.

The coupling member 25 has a disk-shaped press plate 26 for axially pressing the radially inward portion 14 of the diaphragm spring 11 and a plurality of engagement projections 27 circumferentially equidistantly provided as extending radially on the press plate 26. The press plate 26 is pressed by the radially inward portion 14 of the diaphragm spring 11, so that the first pulley body 2 is biased toward the second pulley body 3 by the coupling member 25. The plurality of engagement projections 27 are fitted in the plurality of engagement slits 16 formed in the radially inward portion 14 of the diaphragm spring 11.

The coupling member 12 includes a disk-shaped flange 28 formed integrally with the rotation shaft 1 and an annular member 29 fitted around the flange 28. An annular resilient member 30 such as of a rubber is disposed between the outer circumference of the flange 28 and the inner circumference of the annular member 29 and combined with the flange 28 and the annular member 29, for example, by baking. The resilient member 30 resiliently couples the flange 28 to the annular member 29 for torque transmission, and supports the annular member 29 resiliently with respect to the direction of the rotation.

The annular member 29 has a plurality of through-holes circumferentially equidistantly formed therein as axially extending therethrough. The bars 13 are fitted in the respective through-holes and fixed therein. The bars 13 are further fitted in the support holes 31 of the diaphragm spring 11 for co-rotatably coupling the diaphragm spring 11 to the coupling member 12.

Concentrated loads are applied to the radially inward portion 14 and the radially outward portion 15 of the diaphragm spring 11 in opposite directions, so that the diaphragm spring 11 assumes an axially symmetrical posture. At this time, the bars 13 restrict axial displacement of the diaphragm spring 11 at the support holes 31. Therefore, the radially inward portion 14 and the radially outward portion 15 can be displaced by the same stroke amount in opposite directions by setting the support radius d defined by the respective bars 13 to a predetermined level.

In this embodiment, a tension adjusting mechanism (not shown) adjusts the tension of the belt 7 to off-center the power transmission ring 6, as shown in FIG. 3, in resistance to a biasing force of the diaphragm spring 11 while moving the pulley bodies 2 and 3 away from each other. Thus, the effective radius D of the pulley with respect to the belt 7 stretched around the pulley can be varied.

Where the variable diameter pulley is employed as a driving pulley, fluctuation in the torque transmitted from a driving system to the belt 7 through the rotation shaft 1 can be accommodated by the annular resilient member 30, because the resilient member 30 is provided in a torque transmission path. Where the variable diameter pulley is employed as a driven pulley, fluctuation in the torque transmitted from a driving system to the rotation shaft 1 through the belt 7 can be accommodated by the resilient member 30. In either case, discontinuous rotation is prevented from being transmitted to a driven system (an auxiliary system such as an engine) which receives the torque transmitted through the belt 7, whereby the driven system is prevented from causing vibration or noise and the durability of the driven system can be improved.

Particularly in this embodiment, the torque is transmitted through the diaphragm spring 11 co-rotatably engaged with the respective pulley bodies 2 and 3. In other words, the diaphragm spring 11 is provided in the torque transmission path and, hence, the diaphragm spring 11 cooperates with the resilient member 30 to suppress the fluctuation in the torque to be transmitted. Therefore, the transmission of a fluctuated torque can effectively be suppressed.

Where the variable diameter pulley is employed as a driving pulley, the variable diameter pulley serves as a dynamic damper for suppressing torsional vibration of a driving system which drives the rotation shaft 1 with the power transmission ring 6, the pulley bodies 2 and 3, the diaphragm spring 11 and the annular member 29 functioning as weight means and with the resilient member 30 functioning as spring means. As a result, the torsional vibration of the driving system which drives the rotation shaft 1 can be suppressed. Since the pulley bodies 2 and 3 which are indispensable components of the variable diameter pulley serve as the weight means of the dynamic damper, the suppression of the torsional vibration of the driving system can be realized without increasing the size of the pulley having a simple construction.

Where the variable diameter pulley is employed as a driven pulley, fluctuation in the tension of the belt caused by the fluctuation in the driving torque can be accommodated by allowing the power transmission ring 6 to be slightly displaced eccentrically and concentrically and allowing contacts between the power transmission ring 6 and the pulley bodies 2 and 3 to be circumferentially moved.

Although the flange 28 of the coupling member 12 is formed integrally with the rotation shaft 1 in this embodiment, the flange 28 may be provided as a separate component from the rotation shaft 1 in co-rotatable spline engagement with the rotation shaft 1, and axial movement thereof may be prevented by means of a snap ring or the like.

Second Embodiment

Figure 4:
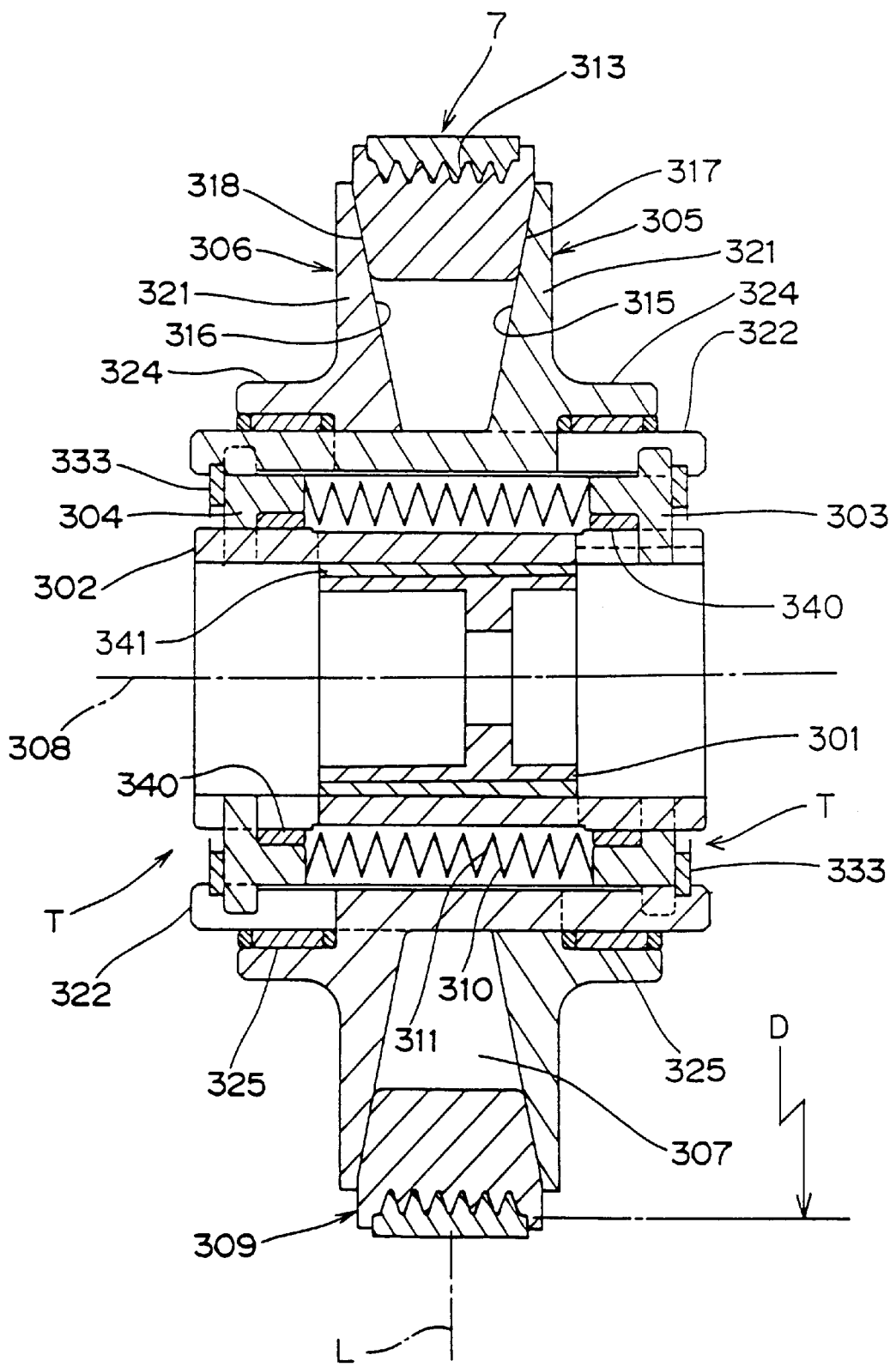
FIG. 4 is a sectional view illustrating a variable diameter pulley according to a second embodiment of the present invention.
Figure 5:
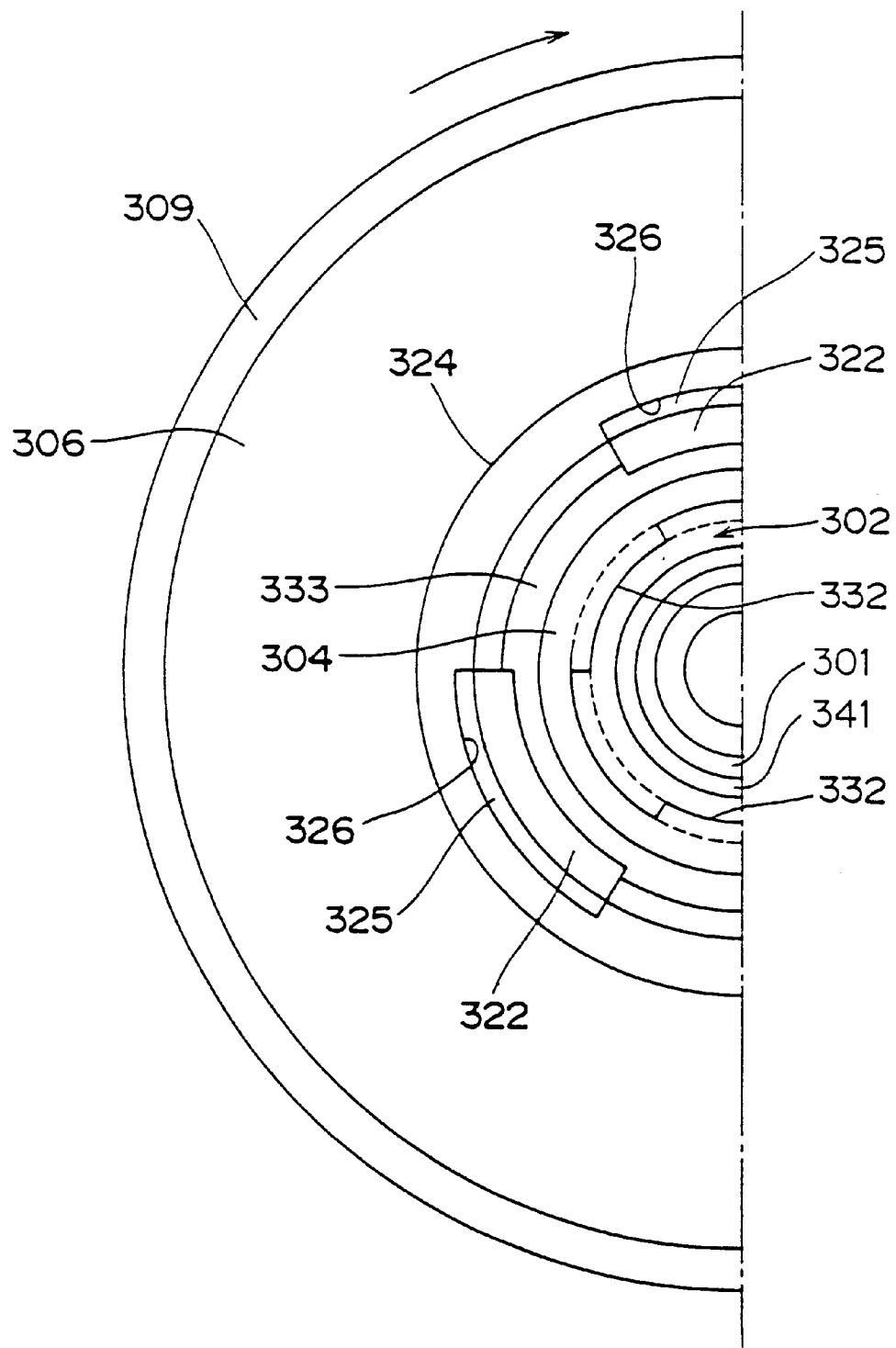
FIG. 5 is a half side view of the variable diameter pulley shown in FIG. 4.

Another embodiment of the present invention will next be described with reference to FIGS. 4 to 12. Referring to FIG. 4, differences in the construction between the second embodiment and the first embodiment shown in FIG. 1 are summarized blow:

i) Although the diaphragm spring 11 is provided as the biasing means through which the torque is transmitted in the embodiment shown in FIG. 1, a plurality of belleville springs 310 are provided as the biasing means through which the torque is not transmitted in this embodiment.

ii) In this embodiment, first and second pulley bodies 305 and 306 are coupled to a rotation shaft 301 for torque transmission, and a pair of torque cam mechanisms T are provided as conversion mechanisms for conversion between angular shift and axial shift of the pulley bodies 305 and 306 relative to the rotation shaft 301.

iii) In this embodiment, a resilient member 341 for accommodating torque fluctuation is disposed between the rotation shaft 301 and an intermediate member 302 fitted around the rotation shaft 301.

More specifically, referring to FIG. 4, the variable diameter pulley includes a cylindrical rotation shaft 301 co-rotatably coupled to a crank shaft of an engine or a shaft of an alternator as an auxiliary system in a coaxial relation therewith, an annular resilient member 341 formed of a rubber around the cylindrical rotation shaft 301 by baking, and a cylindrical intermediate member 302 coupled to the rotation shaft 301 with the resilient member 341 interposed therebetween for torque transmission. The intermediate member 302 is co-rotatably coupled to first and second pulley bodies 305 and 306 by a pair of coupling members 303 and 304, respectively.

A power transmission ring 309 which is adapted to be off-centered from an axis 308 of the rotation shaft 301 and has a transmission surface 313 formed on its outer circumferential surface for transmitting a driving force to a belt 7 is fitted in a V-shaped groove 307 defined between the respective pulley bodies 305 and 306. The variable diameter pulley has plural pairs of annular belleville springs 310 as biasing means for biasing the respective pulley bodies 305 and 306 toward each other. These belleville springs 310 bias the respective pulley bodies 305 and 306 through the coupling members 303 and 304.

The V-shaped groove 307 is defined between opposed power transmission surfaces 315 and 316 of the pulley bodies 305 and 306. Opposite peripheral side faces 317 and 318 of the power transmission ring 309 are kept in contact with the power transmission surfaces 315 and 316, respectively, for power transmission.

Figure 6:
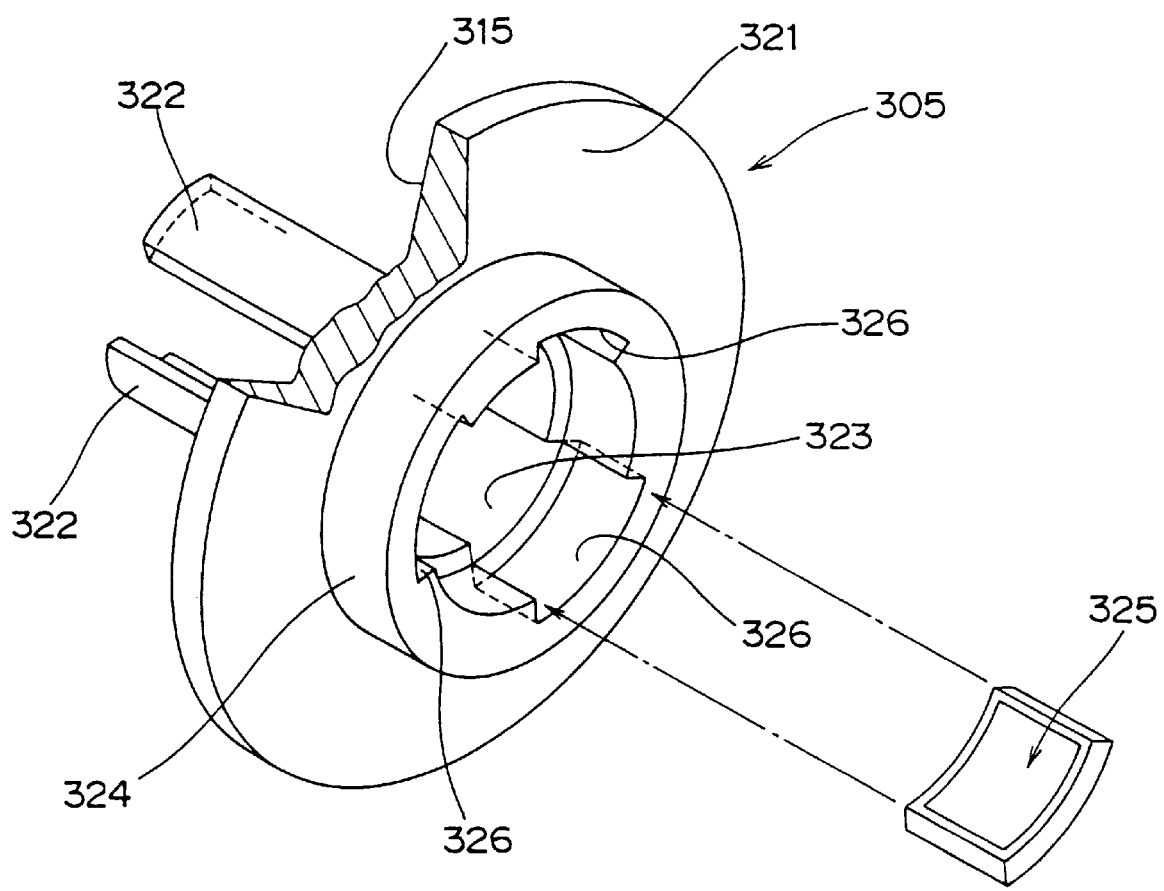
FIG. 6 is an exploded perspective view illustrating a pulley body and a guide member of the variable diameter pulley shown in FIG. 4.
Figure 7:
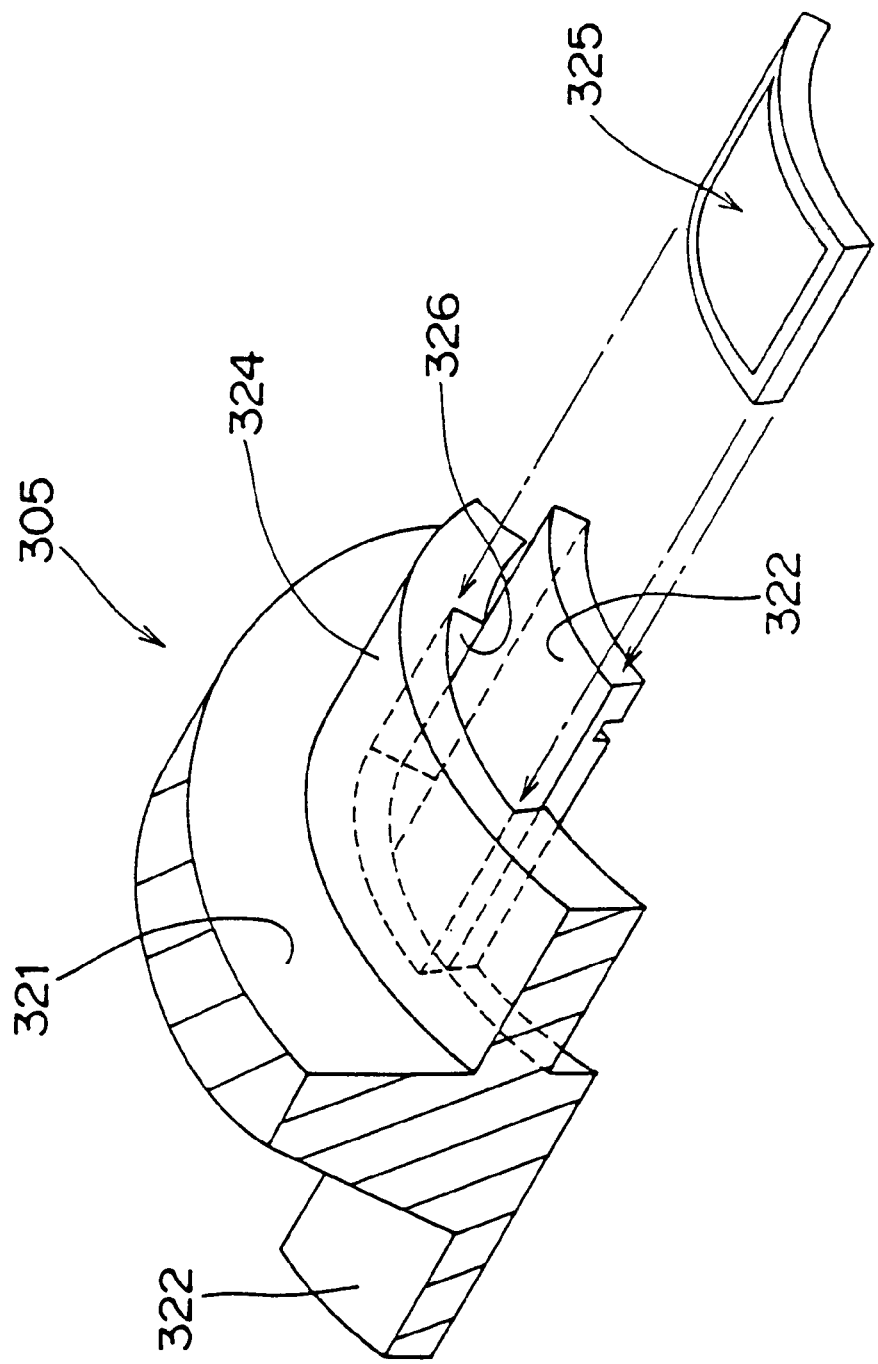
FIG. 7 is an exploded perspective view illustrating the pulley body of the variable diameter pulley shown in FIG. 4 with the guide member fitted on an outer circumferential surface of an engagement projection of the pulley body.

Referring to FIGS. 4 and 6, the pulley body 305 has an annular body 321 having the power transmission surface 315 of a tapered shape for defining the V-shaped groove 307. A plurality of arcuate engagement projections 322 are circumferentially equidistantly provided on an inner circumferential portion of the body 321 as extending therefrom in one axial direction (toward the other pulley body 306). The body 321 has a plurality of arcuate engagement grooves 323 circumferentially equidistantly formed between respective adjacent pairs of engagement projections 322 on the inner circumferential portion thereof. The body 321 further has a cylindrical portion 324 provided on a surface opposite to the power transmission surface 315. The pulley bodies 305 and 306 respectively have laterally symmetrical shapes. Similarly to the pulley body 305, the pulley body 306 has a body 321, engagement projections 322 and a cylindrical portion 324.

Figure 8:
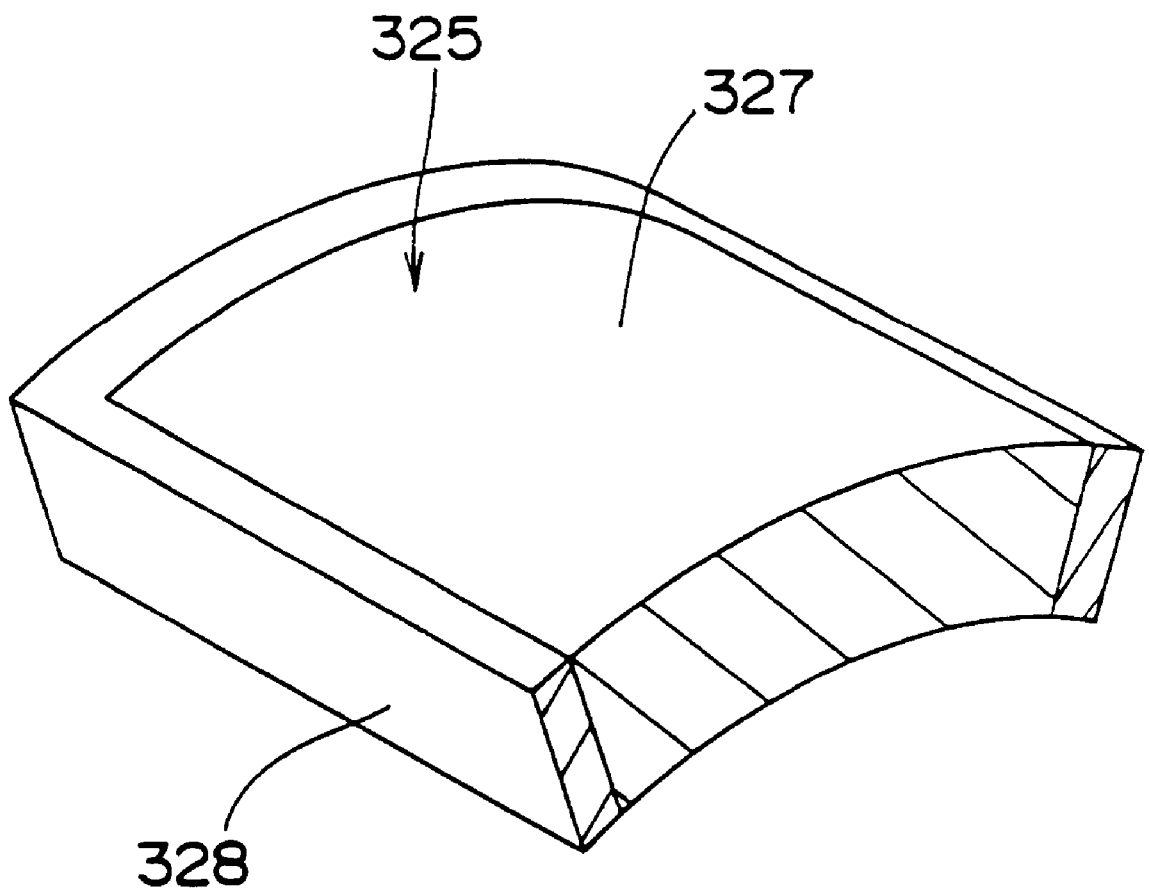
FIG. 8 is a perspective view partially in section illustrating the guide member of the variable diameter pulley shown in FIG. 4.

Referring to FIGS. 4 through 7, a plurality of guide members 325 for guiding the pulley bodies 305 and 306 for axial movement thereof relative to each other are provided on an inner circumferential surface of the cylindrical portion 324. These guide members 325 each have an arcuate shape and cover outer circumferential portions of the engagement projections 322 of the corresponding pulley bodies 305 and 306. The guide members 325 are respectively fitted and retained in a plurality of arcuate retention grooves 326 circumferentially equidistantly formed in the inner circumferential surface of the cylindrical portion 324. As shown in FIG. 8, the guide members 325 each have a guide body 327 of an arcuate plate having a small friction coefficient, and a sealing member 328 such as of a rubber covering the periphery of the guide body 327.

A sleeve bearing such as a cylindrical bush could be employed instead of the guide members for guiding the pulley bodies 305 and 306 for the axial movement thereof relative to each other; however, there is a fear that a lubricant or grease filled in the bush may leak therefrom. In addition, since the bush need to be provided even where there is no member to be brought into sliding contact therewith, the provision of the bush is not advantageous in space saving and strength. This is why the arcuate guide members 325 are provided in contact with the outer circumferential portions of the respective engagement projections 322 as shown in FIG. 9. Since the sealing members 328 respectively abut against the peripheral portions of the engagement projections 322 to prevent the lubricant or grease from leaking outside through the peripheral portions of the engagement projections 322 as shown by an arrow 329 in FIG. 9, the leakage of the lubricant and the like can assuredly be prevented.

Figure 10:
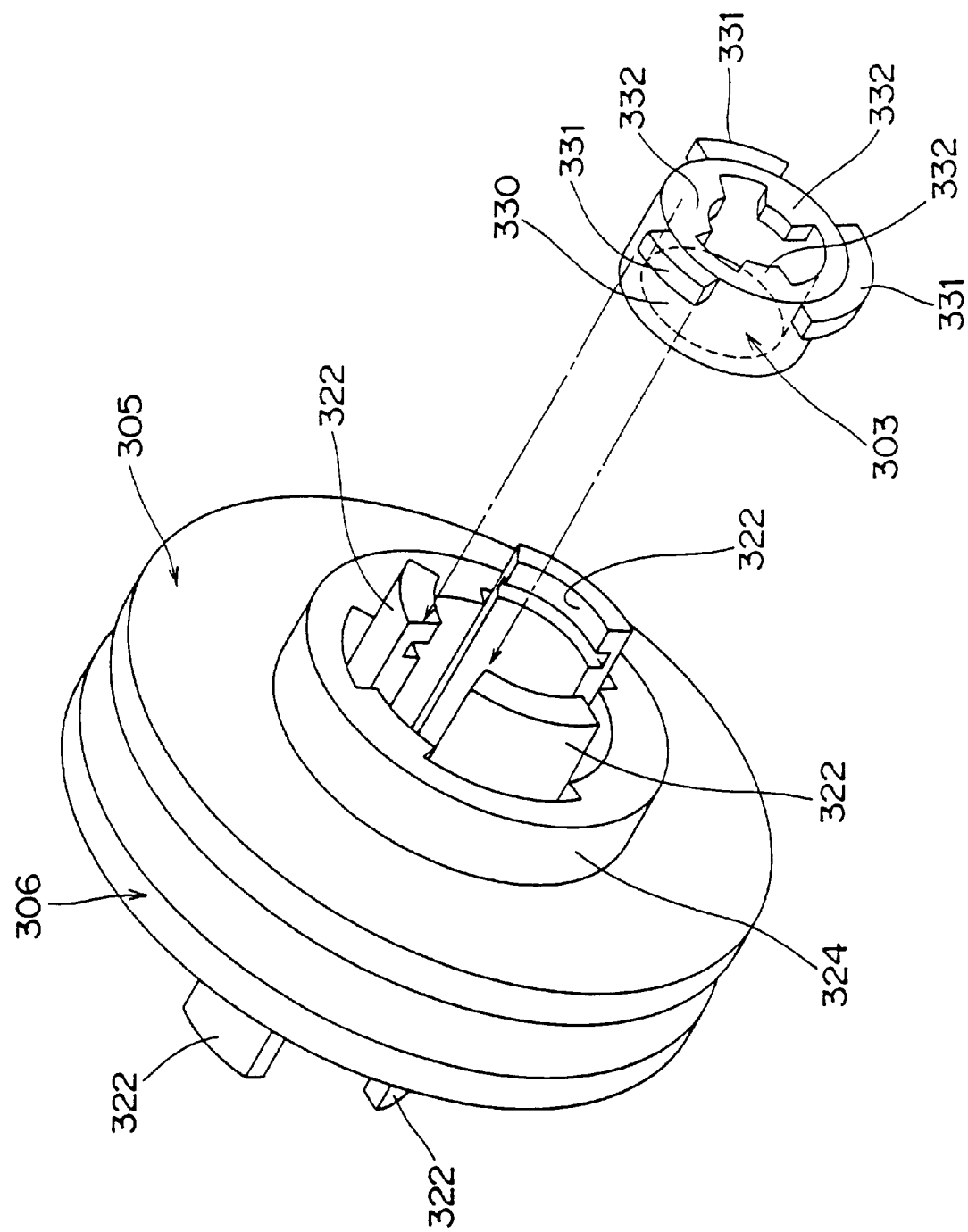
FIG. 10 is an exploded perspective view illustrating a state where the coupling member is to be combined with the preliminarily combined pulley bodies of the variable diameter pulley shown in FIG. 4.

As shown in FIG. 10, the engagement projections 322 of one of the pulley bodies 305 and 306 extend through the engagement grooves 323 of the other pulley body, so that the pulley bodies 305 and 306 are kept in spline engagement with each other for co-rotation while being permitted to move axially relative to each other. That is, the engagement projections 322 of one of the pulley bodies 305 and 306 are fitted through the engagement grooves of the other pulley body.

The left-hand pulley body 306 as seen in FIG. 4 is in spline engagement with the right-hand coupling member 303 for co-rotation therewith. The right-hand pulley body 305 as seen in FIG. 4 is in spline engagement with the left-hand coupling member 304 for co-rotation therewith. Referring to FIG. 10, more specifically, the coupling members 303 and 304 each have a plurality of engagement projections 331 circumferentially equidistantly provided on an outer circumferential portion of the cylindrical portion 330 at one end thereof. The spline engagement is achieved by meshing the engagement projections 331 with the engagement projections 322 of the corresponding pulley bodies 305 ad 306. The coupling members 303 and 304 are prevented from being axially withdrawn by stoppers 333 of snap rings respectively fixed to the inner circumferential portions of the engagement projections 322 of the pulley bodies 305 and 306. The stoppers 333 are respectively fitted in grooves formed in the inner circumferential portions of the engagement projections 322 of the pulley bodies 305 and 306.

Figure 11:
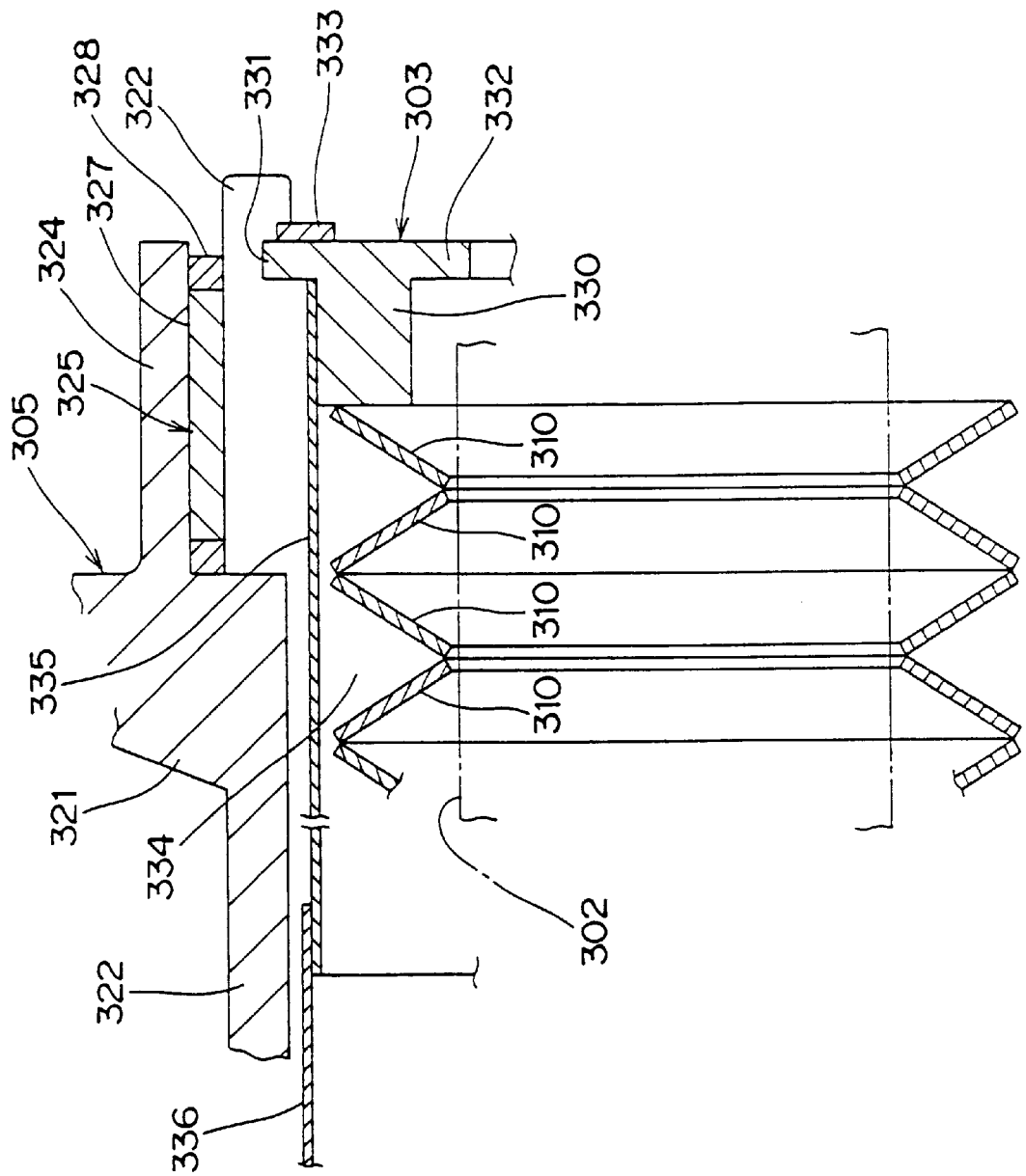
FIG. 11 is an enlarged sectional view illustrating an inner circumferential portion of the variable diameter pulley shown in FIG. 4.

Referring to FIG. 11, the belleville springs 310 are provided in a housing space 334 defined by the coupling members 303 and 304 between the inner circumferential surfaces of the pulley bodies 305 and 306 and the outer circumferential surface of the intermediate member 302. These annular belleville springs 310 are disposed coaxially about the rotation shaft 301. The outer boundary of the housing space 334 is defined by a pair of thin wall cylinders 335 and 336 serving as sealing members fitted on the outer circumferential surfaces of the coupling members 303 and 304. The thin wall cylinder 335 is fitted in the thin wall cylinder 336 in a slidably overlapping relation. Therefore, the overlapping amount of these thin wall cylinders can be varied as the coupling members 303 and 304 are axially moved relative to each other. The thin wall cylinders 335 and 336 are, for example, of a thin stainless plate.

Since the housing space 334 is surrounded by the thin wall cylinders 335 and 336, leakage of the lubricant and the like filled therein can assuredly be prevented. The provision of the aforesaid sealing members 328 further ensures the prevention of the leakage of the lubricant.

The annular belleville springs 310 are arranged in an alternately inverted relation, so that the pulley bodies 305 and 306 are biased away from each other through the coupling members 303 and 304. More specifically, the coupling members 303 and 304 are always pressed against the corresponding stoppers 333 by the belleville springs 310. Therefore, the coupling members 303 and 304 compress or decompress the belleville springs 310 to axially move the corresponding pulley bodies 306 and 305 in unison. Therefore, a change in the width of the V-shaped groove 307 defined between the pulley bodies 305 and 306 is equated with the sum of the stroke amounts of the plurality of belleville springs 310.

Figure 12:
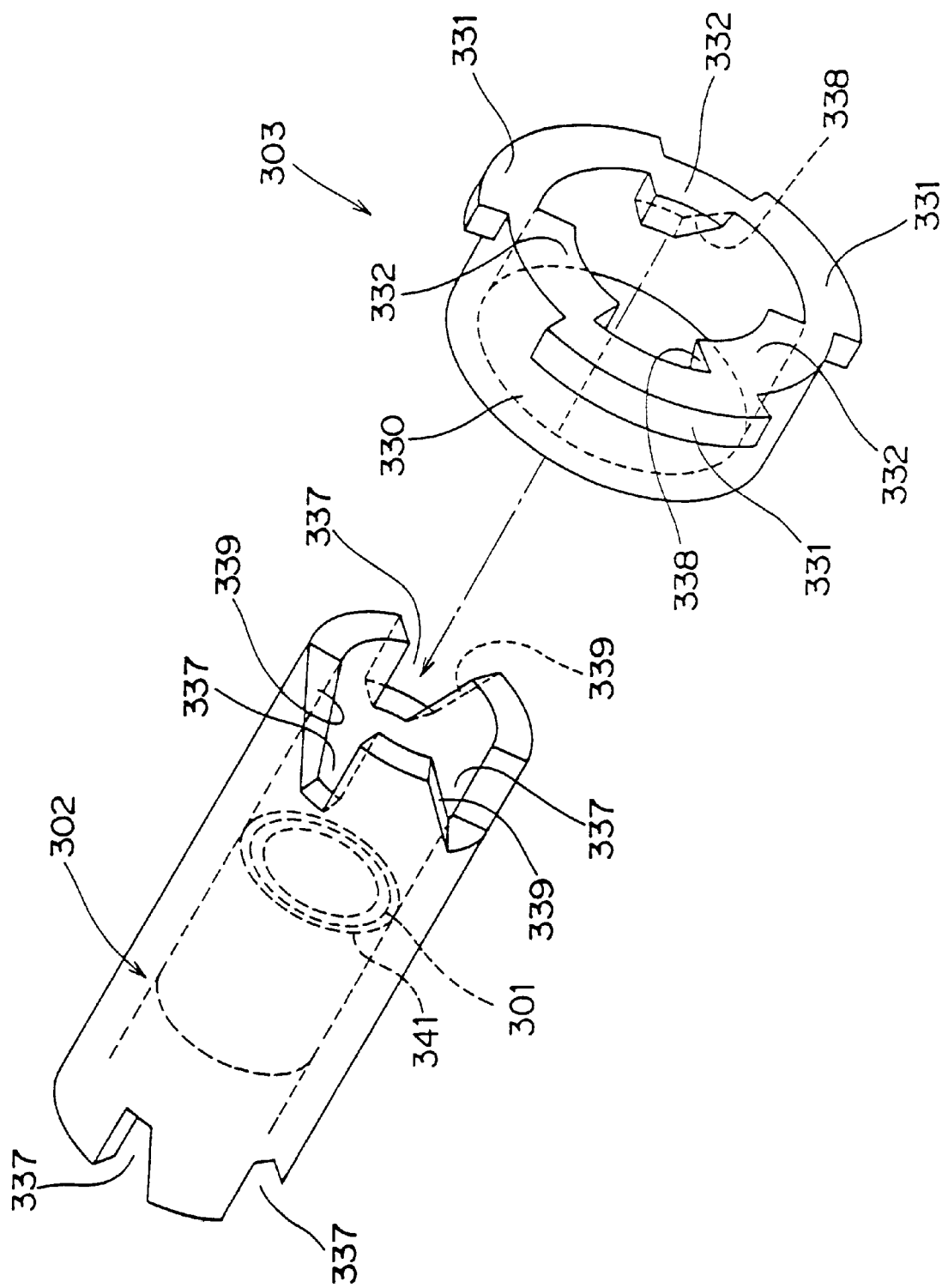
FIG. 12 is an exploded perspective view illustrating the coupling member and a rotation shaft of the variable diameter pulley shown in FIG. 4.

Referring to FIG. 4, the coupling members 303 and 304 are each rotatably supported on the outer circumferential surface of the intermediate member 302 by a slide bearing 340 such as a metal bush, etc. Further, the coupling members 303 and 304 each are in a cam engagement with the intermediate member 302. Referring to FIG. 12, more specifically, the coupling members 303 and 304 each have a plurality of engagement projections 332 circumferentially equidistantly provided on the inner circumferential surface thereof. The engagement projections 332 are respectively fitted in a plurality of engagement grooves 337 which are circumferentially equidistantly formed in axially opposite end portions of the cylindrical intermediate member 302.

The engagement projections 332 are respectively engaged with the engagement grooves 337 with slant cam faces 338 of the engagement projections 332 kept in contact with slant cam faces 339 of the engagement grooves 337. The inclination of each of the cam faces 338 of the coupling member 303 is angularly opposite to the inclination of each of the cam faces 338 of the coupling member 304 (similarly, the inclination of each of the cam faces 339 at one end of the intermediate member 302 is angularly opposite to the inclination of each of the cam faces 339 at the other end of the intermediate member 302). Therefore, if a phase shift between the coupling members 303 and 304 occurs with respect to the intermediate member 302, the coupling members 303 and 304 are axially shifted by an equal distance in opposite directions. As a result, the pulley bodies 305 and 306 are equidistantly moved toward and away from each other.

Torque cam mechanisms T are respectively constituted by the coupling members 303 and 304, the engagement projections 322 and 331 constituting spline mechanisms for coupling each of the coupling members 303 and 304 to each of the corresponding pulley bodies 306 and 305, and the pairs of cam faces 338 and 339 constituting cam mechanisms for coupling each of the coupling members 303 and 304 to the intermediate member 302. When an angular shift occurs with respect to the rotation shaft 301 between the pulley bodies 305 and 306 which rotate in unison in the torque transmission, the angular shift is converted into an axial shift by the torque cam mechanisms T to equidistantly move the respective pulley bodies 305 and 306 toward and away from each other. Thus, the widthwise center of the belt 7 is kept consistent.

Where the variable diameter pulley is employed as a driving pulley, for example, a load torque acts as a force to cause a phase shift between the pulley bodies 305 and 306 with respect to the rotation shaft 301 in a direction opposite to the direction of the rotation. The force which causes the phase shift is converted by the torque cam mechanisms T into a force which causes the respective pulley bodies 305 and 306 to be moved toward each other. This force is further converted into a force which causes the power transmission ring 309 (which assumes a state as shown in FIG. 4, for example) to be displaced radially outwardly of the variable diameter pulley 8 by the tapered power transmission surfaces 315 and 316, thereby increasing the effective radius D of the pulley with respect to the belt 7.

When the torque is fluctuated, a portion of the power transmission ring 309 in contact with the belt 7 is likely to increase the distance between the pulley bodies 305 and 306 thereby to move radially inwardly of the variable diameter pulley 8. However, the radially inward movement of the power transmission ring 309 is prevented by the biasing force applied by the belleville springs 310 and the force which causes the power transmission ring 309 to be moved radially outward. Even if a force which is likely to reduce the effective radius is exerted on the pulley due to the fluctuation in the load torque, the torque cam mechanisms T generate a counter force which resists this force, thereby preventing the change in the effective radius D of the variable diameter pulley which may otherwise be caused by the fluctuation in the load torque.

It is noted that screw mechanisms may be employed as the torque cam mechanisms. Further, a compression coil spring may be provided concentrically about the rotation shaft 301 as the biasing means instead of the belleville springs 310.

In accordance with this embodiment, the fluctuation in the torque transmitted between the rotation shaft 301 and the belt 7 can be suppressed by the resilient member 341 provided in the torque transmission path, whereby vibration and noise of a driven system can be reduced and the durability of the driven system can be improved.

Where the variable diameter pulley according to this embodiment is employed as a driving pulley, the variable diameter pulley serves as a dynamic damper which employs the resilient member 341 as spring means and the components resiliently supported with respect to the direction of the rotation by the resilient member 341 (i.e., the intermediate member 302, the coupling members 303 and 304 and the pulley bodies 305 and 306) as weight means. Thus, torsional vibration of a driving system which drives the rotation shaft 301 can effectively be suppressed.

Third Embodiment

Figure 13:
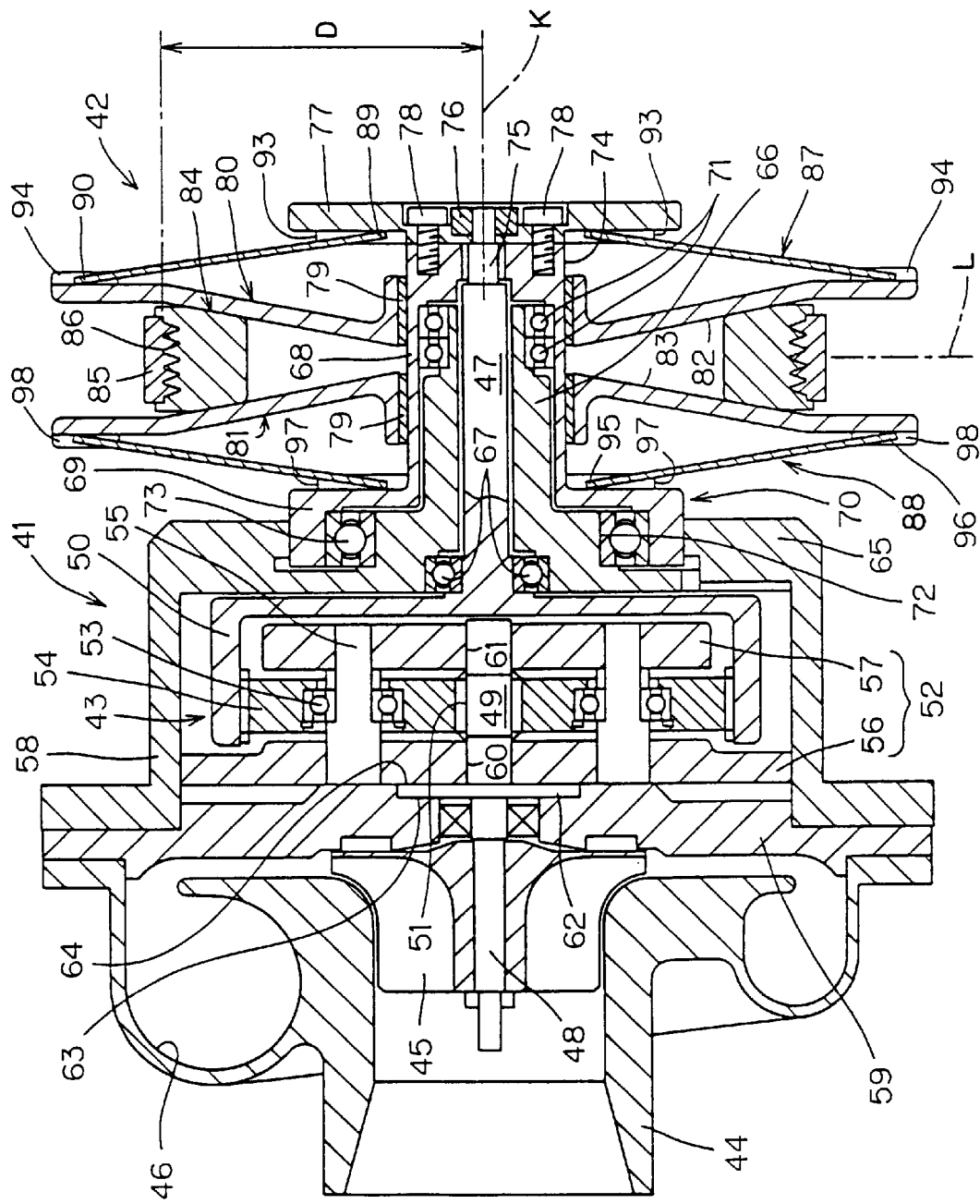
FIG. 13 is a sectional view illustrating a supercharger including a variable diameter pulley according to a third embodiment of the present invention.

FIG. 13 is a sectional view illustrating a supercharger including a variable diameter pulley according to a third embodiment of the present invention. Referring to FIG. 13, a supercharger 41 includes a variable diameter pulley 42 as a continuously variable transmission system which is driven by an internal combustion engine not shown, and a planetary step-up gear mechanism 43 which is driven by the variable diameter pulley 42. A runner 45 disposed within a compressor housing 44 is rotatively driven at a high speed by means of the variable diameter pulley 42 and the planetary step-up gear system 43 to compressively feed air through a scroll 46.

The planetary step-up gear mechanism 43 has an input shaft 47 as a rotation shaft coupled to the variable diameter pulley 42 and an output shaft 49 serving as a runner shaft (rotation shaft) 48 of the runner 45.

The planetary step-up gear mechanism 43 has a ring gear 50 provided at one end of the input shaft 47, a sun gear 51 provided at one end of the output shaft 49, a plurality of planetary gears 54 rotatably supported by a carrier 52 via a roller bearing 53 and meshed with the sun gear 51 and the ring gear 50.

The carrier 52 includes a first annular member 56 and a second annular member 57 respectively supporting opposite ends of shafts 55 of the planetary gears 54. The first annular member 56 is fixed to an annular partitioning plate 59 which is provided between a gear housing 58 for the planetary step-up gear mechanism 43 and the compressor housing 44. The output shaft 49 is radially supported by an inner circumferential surface of the first member 56 via a fluid lubrication bearing 60 of a dynamic pressure spiral groove bearing (SGB).

The second member 57 is supported by an end portion of the output shaft 49 via a fluid lubrication bearing 61 of a dynamic pressure spiral groove bearing (SGB) fitted within an inner circumferential surface thereof. The SGB has a shallow spiral groove on either one of a fixed side (the side of the carrier 52) and a stationary side (the side of the output shaft 49) thereof, and a fluid pressure is generated by a pumping effect of the groove so that the output shaft 49 can be supported in a non-contacting manner by the SGB.

A disk plate rotor 62 is provided at an intermediate portion of the output shaft 49 for co-rotation therewith. Fluid lubrication bearings 63 and 64 of SGBs for axially supporting the output shaft 49 are provided between one side of the rotor 62 and a surface of the annular partitioning plate 59 opposing to the rotor 62 and between the other side of the rotor 62 and the first member 56.

The gear housing 58 is filled with a lubrication oil, which is stirred upward and supplied to the respective fluid lubrication bearings 60, 61, 63 and 64 through surfaces of the annular partitioning plate 59 and the carrier 52. A dynamic pressure generated at this time allows the fluid lubrication bearings to perform a bearing function and an oil film damper function.

The input shaft 47 is rotatably supported within an inner circumferential surface of a boss 66 projecting from an end face 65 of the gear housing 58 by a pair of roller bearings 67. The variable diameter pulley 42 for transmitting a driving torque to the input shaft 47 is fitted around the boss 66.

The variable diameter pulley 42 includes a hub 68 of a closed-end cylinder fitted around the boss 66 and a coupling member 70 having a disk plate 69 provided at one end of the hub 68. The hub 68 of the coupling member 70 is rotatably supported around the boss 66 by means of a pair of roller bearings 71, and the disk plate 69 of the coupling member 70 is rotatably supported in an annular receiving groove 72 formed in the end face 65 of the gear housing 58 by means of a roller bearing 73.

An end 74 of the hum 68 of the coupling member 70 is co-rotatably coupled to an end of the input shaft 47. More specifically, a spline portion 75 provided at the end of the input shaft 47 is fitted in a spline hole formed at the end 74 of the hub 68 and having a shape compatible with the spline portion 75 for co-rotatable coupling between the input shaft 47 and the hub 68.

A reference numeral 76 denotes a nut threadingly engaged with a thread portion projecting from the end of the input shaft 47 for fastening the input shaft 47 to the annular partitioning plate 59. A reference numeral 77 denotes an annular end plate which is fastened to the end 74 of the hub 68 by screws 78 and serves as a seat for the nut 76 with the thread portion of the input shaft 47 extending through the center thereof.

The variable diameter pulley 42 has a first pulley body 80 and a second pulley body 81 axially, movably and rotatably supported around the hub 68 by means of a roller bearing 79. The pair of pulley bodies 80 and 81 have power transmission surfaces 82 and 83, respectively, formed in a tapered shape on opposed surfaces thereof. A power transmission ring 84 having a generally trapezoidal shape in section is held between the pair of power transmission surfaces 82 and 83 in such a manner that the power transmission ring 84 can be off-centered from an axis K of the pair of pulley bodies 80 and 81 (see Fig. 15). The power transmission ring 84 has a transmission surface 86 on its outer periphery for transmitting power to a belt 85. The belt 85 is wrapped around the power transmission ring 84 in contact with the transmission surface 86. The transmission surface 86 is formed with circumferential grooves which respectively mesh with ribs of the belt 85.

The variable diameter pulley 42 has a pair of belleville springs 87 and 88 as biasing means for biasing the pair of pulley bodies 80 and 81 toward each other. These belleville springs 87 and 88 have the same properties. The outer circumferences of the belleville springs 87 and 88 are engaged with the pulley bodies 80 and 81, respectively, for torque transmission. The inner circumferences of the belleville springs 87 and 88 are engaged with the coupling member 70 for torque transmission.

Figure 14:
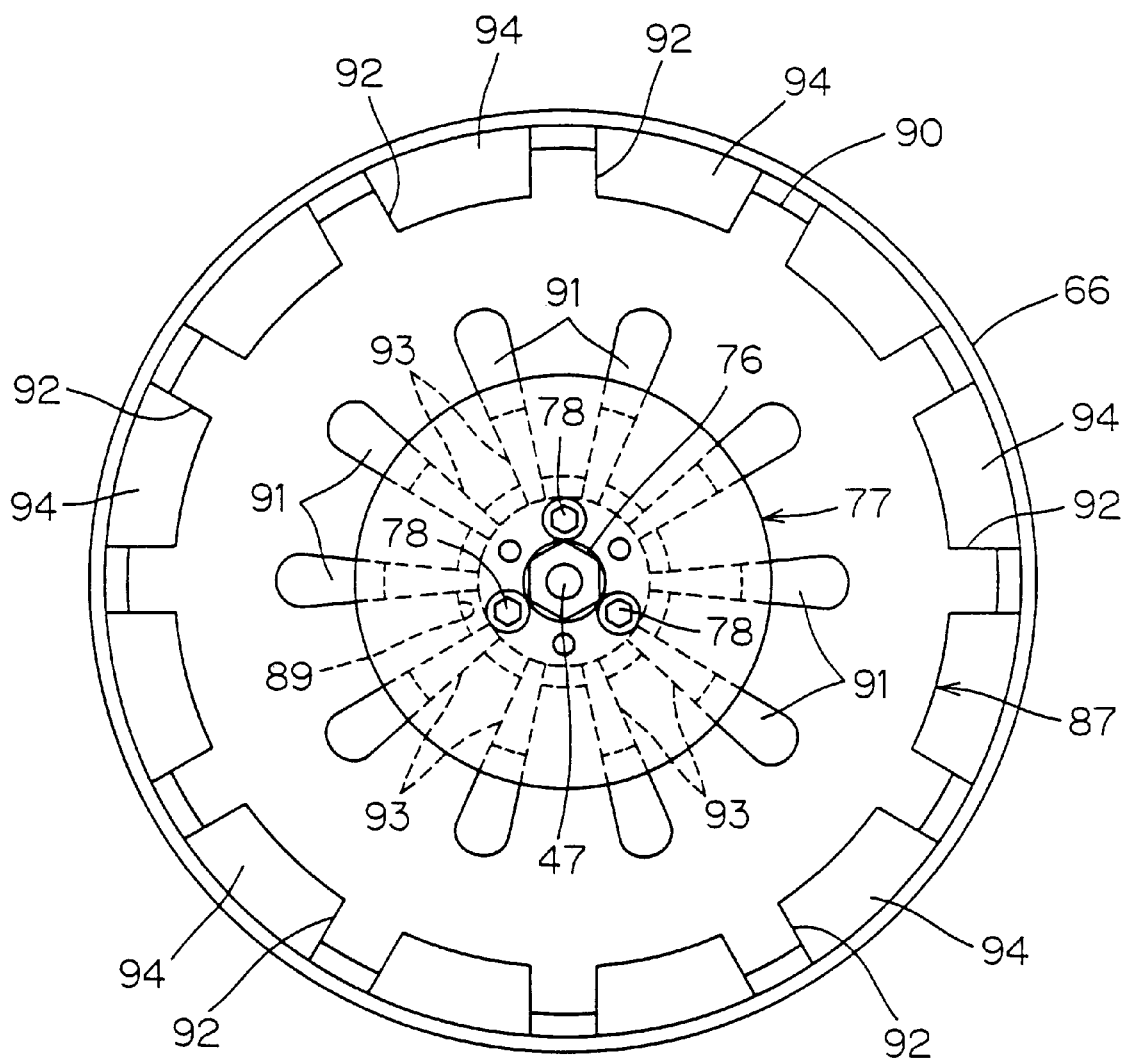
FIG. 14 is a side view of the variable diameter pulley shown in FIG. 13.

Referring to FIGS. 13 and 14, the right-hand belleville spring 87 has a plurality of engagement grooves 91 and 92 circumferentially equidistantly formed in an inner circumferential portion 89 and an outer circumferential portion 90 thereof, respectively. A plurality of engagement plate projections 93 radially provided on the end plate 77 fixed to the coupling member 70 are fitted in the respective engagement grooves 91 formed in the inner circumferential portion 89 of the belleville spring 87. A plurality of engagement projections 94 circumferentially equidistantly provided on an outer circumferential portion of the pulley body 80 are fitted in the engagement grooves 92 formed in the outer circumferential portion 90 of the belleville spring 87.

The left-hand and right-hand belleville springs 88 and 87 have the same configuration, but are warped in opposite directions. A plurality of engagement projections 97 provided on the disk plate 69 of the coupling member 70 as extending radially are fitted in engagement grooves (not shown) formed in an inner circumferential portion 95 of the belleville spring 88. A plurality of engagement projections 98 circumferentially equidistantly provided on an outer circumferential portion of the pulley 81 are fitted in engagement grooves (not shown) formed in an outer circumferential portion 96 of the belleville spring 88.

Figure 15:
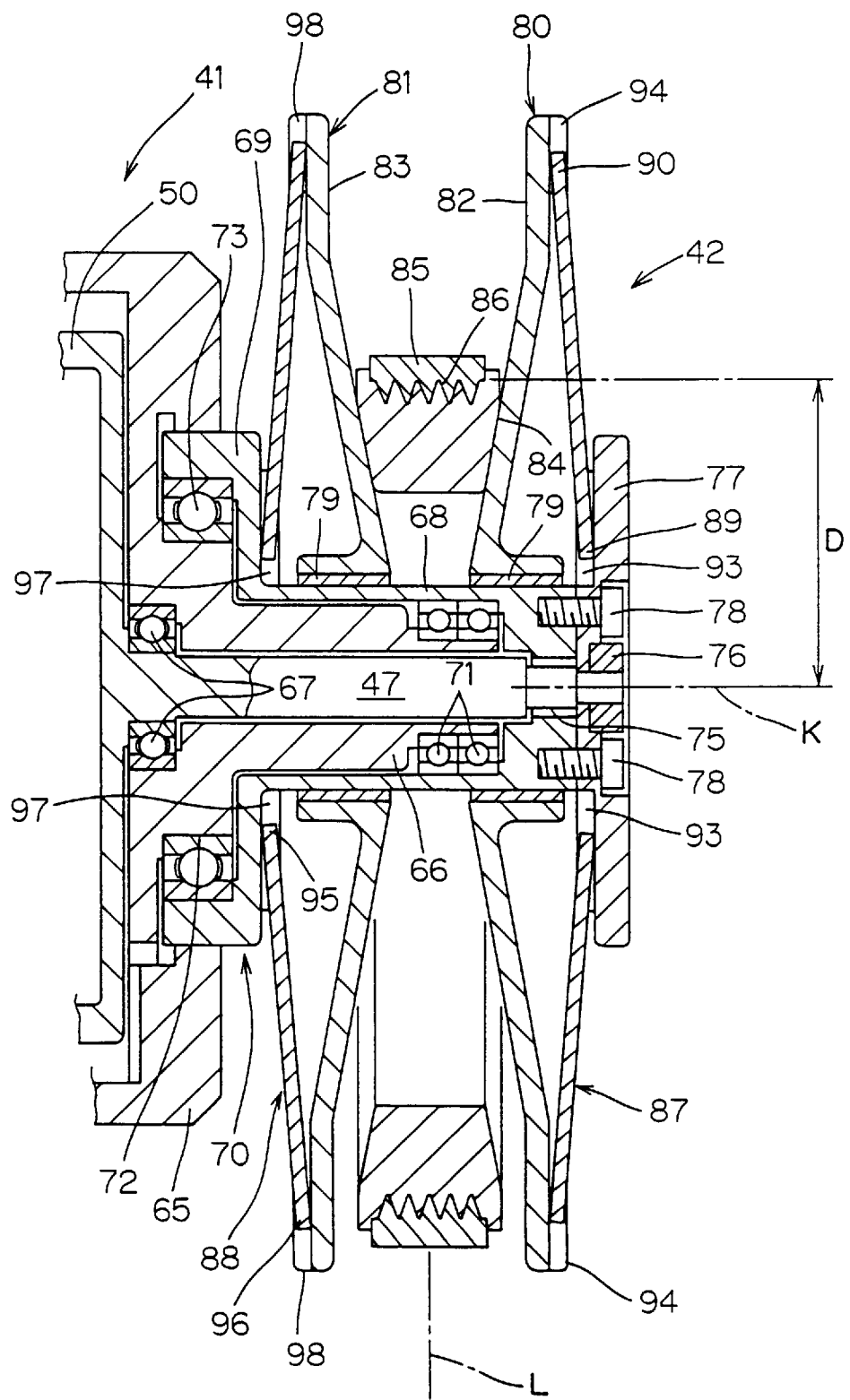
FIG. 15 is a sectional view illustrating the variable diameter pulley shown in FIG. 14 with its power transmission ring being off-centered from the axis thereof.

Thus, the belleville springs 87 and 88, the coupling member 70 and the pulley bodies 80 and 81 is rotated in unison. More specifically, a torque transmitted to the power transmission ring 84 through the belt 85 is further transmitted to the input shaft 47 of the planetary step-up gear mechanism 43 through the pulley bodies 80 and 81, the belleville springs 87 and 88 and the coupling member 70. The tension of the belt 85 is adjusted by a tension adjusting mechanism (not shown) to off-center the power transmission ring 84 as shown in FIG. 15, thereby changing the effective radius D of the pulley with respect to the belt 85.

Since the belleville springs 87 and 88 are designed to have the same spring constant, the inner and outer circumferential portions 89 and 90 of the belleville spring 87 can be displaced (or axially warped) by the same amount as the inner and outer circumferential portions 95 and 96 of the belleville spring 88 in opposite directions. Therefore, when the power transmission ring 84 is off-centered as shown in FIG. 15, the axially middle point between the pulley bodies 80 and 81 can be kept consistent. As a result, the widthwise center L of the belt 85 can be kept substantially consistent.

In this embodiment, the pulley bodies 80 and 81 are biased by the corresponding belleville springs 87 and 88 as described above and, therefore, the belleville springs 87 and 88 are each warped by a warp amount half that required for biasing the pulley bodies by a single belleville spring. Hence, stresses (flexure stresses) imposed on the belleville springs 87 and 88 can be reduced, so that the durability of the belleville springs can be improved.

In addition, a grasping force of the belleville springs 87 and 88 can be enhanced while the stresses on the belleville springs are suppressed within an allowable stress range without increasing the outer diameters of the belleville springs 87 and 88. Even if the outer diameters of the belleville springs 87 and 88 are reduced thereby to increase the load on the springs, for example, the levels of the stresses imposed on the springs may be reduced in comparison with a case where a single belleville spring is employed.

Particularly, where the belleville springs 87 and 88 serve for torque transmission as in this embodiment, the durability of the springs can remarkably be improved. Though the durability of the belleville springs 87 and 88 is liable to be reduced because a torsional stress due to the torque and a flexure stress due to the biasing force are imposed thereon, the reduction in the durability can be suppressed by reducing at least the flexure stress.

Since the pulley bodies 80 and 81 are biased from the left and right sides thereof by the belleville springs 87 and 88 having the same properties, the widthwise center L of the belt 85 can generally be kept consistent.

The present embodiment applied to the supercharger does not require two pulleys for speed change and, therefore, the a-size of the transmission system can remarkably be reduced. As a result, a space problem associated with incorporation of the supercharger in an automobile can be eliminated.

Where the tension of the belt is fluctuated due to the fluctuation in the driving torque transmitted from the internal combustion engine, the power transmission ring 84 is slightly displaced eccentrically or concentrically in accordance with the tension fluctuation and the contacts between the power transmission ring 84 and the pulley bodies 80 and 81 are circumferentially displaced so that the tension fluctuation can be accommodated. Therefore, the planetary step-up gear mechanism 43 is prevented from being adversely affected by the tension fluctuation. That is, adverse effects of the tension fluctuation imposed on the planetary step-up gear mechanism 43 by the continuously variable transmission system can be alleviated. The service lives of the respective bearings in the planetary step-up gear mechanism 43 can be extended. Further, wear of the teeth of the respective gears 50, 51 and 54 can be suppressed, so that the service lives of the gears can be extended. In addition, vibration and noise of the transmission system can be suppressed which may otherwise occur due to gear teeth clicking and the like.

Fourth Embodiment

Figure 16:
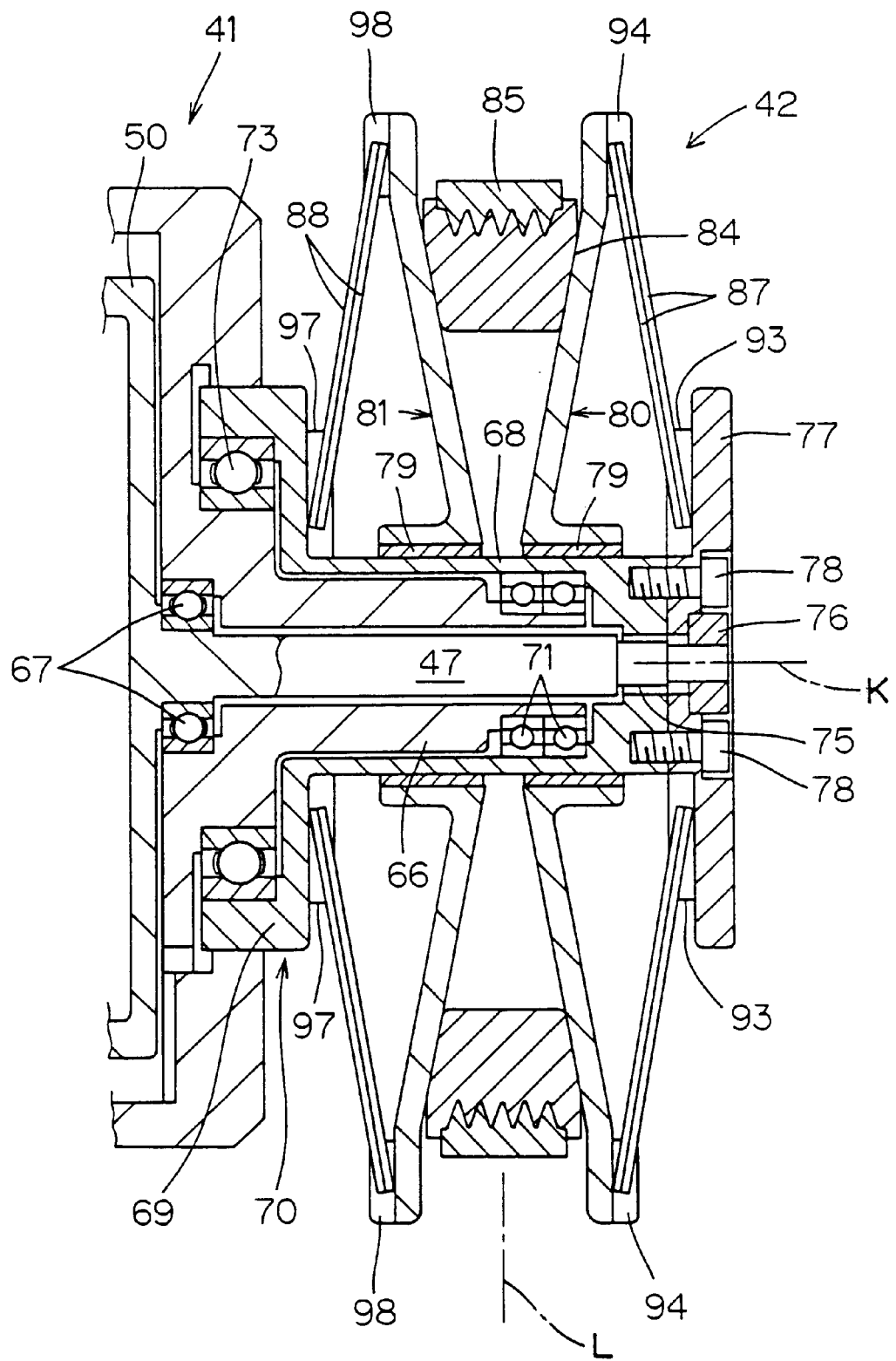
FIG. 16 is a sectional view illustrating a variable diameter pulley according to a fourth embodiment of the present invention.

FIG. 16 illustrates a fourth embodiment of the present invention. Referring to FIG. 16, the fourth embodiment is different from the third embodiment shown in FIG. 13 in that the pulley bodies 80 and 81 are biased by plural-ply belleville springs 87 and 88, respectively. Although two-ply belleville springs are shown in FIG. 16, three-or-more-ply belleville springs may be used. Since the plies of the plural-ply belleville springs each have a small thickness in general, the plural-ply belleville springs takes little space.

In this embodiment, a load imposed on each of the plies of the plural-ply belleville springs 87 and 88 is reduced and, therefore, the total biasing force to be applied by the plural-ply belleville springs 87 and 88 can be increased even if the plies of the springs each have a small load stress. More specifically, even if plural-ply belleville springs each having a smaller size (diameter) are used instead of the single-ply belleville springs employed in the third embodiment, an equivalent biasing force can be applied to the pulley bodies while the stress imposed on each of the plies of the belleville springs is suppressed within an allowable stress range. Therefore, a variable diameter pulley which has a smaller size, a smaller transmission loss and an excellent durability can be realized.

If the plies of the plural-ply belleville springs to be used each have the same size as the single-ply belleville spring used in the third embodiment, the biasing force to be applied to the pulley bodies can be increased plural times (e.g., twice, three times). As a result, a variable diameter pulley having a smaller size and a greater torque transmission capacity can be realized.

While the present invention has thus been described by way of the embodiments thereof, the invention is not limited to these embodiments. In the first and second embodiments, for example, the resilient member for suppressing the torque fluctuation or the torsion fluctuation may be located in any position in the torque transmission path as long as it can transmit the torque.

Where the variable diameter pulley serves as the dynamic damper including the resilient member in the first or second embodiment, a dummy weight may be provided as the weight means to adjust a vibration frequency to be attenuated, as long as the provision of the dummy weight does not leads to an increase in the size of the pulley.

Various modifications may be made to the invention without departing from the spirit and scope of the invention.

What is claimed is:

1. A variable diameter pulley which is capable of varying its effective diameter with respect to a belt, the variable diameter pulley comprising:

first and second annular pulley bodies which are each rotatable about a rotation shaft and movable along the rotation shaft;

first and second power transmission surfaces formed in a taper shape on opposed surfaces of the first and second pulley bodies, respectively;

a power transmission ring held by the first and second power transmission surfaces in a state where the power transmission ring is movable eccentrically with respect to an axis of the first and second pulley bodies, and capable of being wrapped with the belt on an outer circumferential surface thereof; and a biasing means for biasing the first and second pulley bodies toward each other.

2. A variable diameter pulley as set forth in claim 1, wherein the biasing means includes a belleville spring.

3. A variable diameter pulley as set forth in claim 1, wherein the biasing means includes a plural-ply belleville spring.

4. A variable diameter pulley as set forth in claim 1, wherein power is transmitted between the pulley bodies and the rotation shaft via the biasing means.

5. A variable diameter pulley as set forth in claim 4, further comprising coupling means for coupling the biasing means and the rotation shaft for power transmission.

6. A variable diameter pulley as set forth in claim 5, wherein the biasing means includes an annular belleville spring, and the coupling means includes a shaft engaged with a hole formed in a radially intermediate portion of the belleville spring.

7. A variable diameter pulley as set forth in claim 5, wherein the coupling means includes power fluctuation suppressing means for suppressing fluctuation in power transmitted thereto.

8. A variable diameter pulley as set forth in claim 7, wherein the power fluctuation suppressing means includes a first member co-rotatable with the rotation shaft, a second member co-rotatable with the biasing means, and a resilient member disposed between the first and second means and adapted to be deformed in accordance with a phase shift between the first and second members.

9. A variable diameter pulley as set forth in claim 8, wherein the first member is provided integrally with the rotation shaft.

10. A variable diameter pulley as set forth in claim 8, wherein the resilient member includes a rubber member which is fixed to the first and second members by baking thereof.

11. A variable diameter pulley as set forth in claim 4, wherein the biasing means couples the pulley bodies to each other for power transmission.

12. A variable diameter pulley as set forth in claim 11, wherein the biasing means includes an annular belleville spring, and inner and outer circumferential portions of the belleville spring are respectively co-rotatably engaged with the corresponding pulley bodies.

13. A variable diameter pulley as set forth in claim 12, wherein one of the pulley bodies has a boss extending through the other pulley body, and the inner circumferential portion of the belleville spring is co-rotatably engaged with the boss.

14. A variable diameter pulley as set forth in claim 4, wherein the biasing means includes first biasing means co-rotatably coupled to one of the pulley bodies and second biasing means co-rotatably coupled to the other pulley body.

15. A variable diameter pulley as set forth in claim 14, wherein the first and second pulley bodies are disposed between the first and second biasing means.

16. A variable diameter pulley as set forth in claim 1, further comprising coupling means for co-rotatably coupling the first and second pulley bodies.

17. A variable diameter pulley as set forth in claim 16, further comprising power fluctuation suppressing means for suppressing fluctuation in power transmitted between the coupling means and the rotation shaft.

18. A variable diameter pulley as set forth in claim 17, wherein the power fluctuation suppressing means includes a resilient member disposed between the coupling means and the rotation shaft and adapted to be deformed in accordance with a phase shift between the coupling means and the rotation shaft.

19. A variable diameter pulley as set forth in claim 18, wherein the resilient member includes a rubber member which is fixed to the coupling means and the rotation shaft by baking thereof.

20. A variable diameter pulley as set forth in claim 1, further comprising power fluctuation suppressing means disposed in a power transmission path between the pulley bodies and the rotation shaft for suppressing fluctuation in transmitted power.

21. A variable diameter pulley as set forth in claim 20, further comprising an annular intermediate member fitted around the rotation shaft co-rotatably with the pulley bodies, wherein the power fluctuation suppressing means includes a resilient member disposed between the rotation shaft and the intermediate member for power transmission.

22. A variable diameter pulley as set forth in claim 20, wherein power is transmitted between the pulley bodies and the rotation shaft via the biasing means, and the power fluctuation suppressing means includes the biasing means.

23. A variable diameter pulley as set forth in claim 1, further comprising an inertial member including the first and second pulley bodies and resilient support means for resiliently supporting the inertial member toward and against the direction of rotation of the rotation shaft.

24. A variable diameter pulley as set forth in claim 23, wherein power is transmitted between the pulley bodies and the rotation shaft via the biasing means and the resilient support means includes the biasing means.

* * * * *